(12) United States Patent
Liu et al.

(10) Patent No.: US 10,873,353 B2
(45) Date of Patent: Dec. 22, 2020

(54) SIGNAL PROCESSING DEVICE FOR A COMMUNICATION SYSTEM USABLE IN PARTICULAR IN A BATTERY SYSTEM

(71) Applicant: Robert Bosch GmbH, Stuttgart (DE)

(72) Inventors: Wenqing Liu, Weil der Stadt (DE); Nicola Mingirulli, Stuttgart (DE); Thomas Buck, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/612,656

(22) PCT Filed: Apr. 18, 2018

(86) PCT No.: PCT/EP2018/059806
§ 371 (c)(1),
(2) Date: Nov. 11, 2019

(87) PCT Pub. No.: WO2018/206246
PCT Pub. Date: Nov. 15, 2018

(65) Prior Publication Data
US 2020/0076459 A1 Mar. 5, 2020

(30) Foreign Application Priority Data
May 11, 2017 (DE) .......................... 10 2017 207 943

(51) Int. Cl.
*H04B 1/10* (2006.01)
*B60L 58/18* (2019.01)
*H04B 3/54* (2006.01)

(52) U.S. Cl.
CPC ............ *H04B 1/1036* (2013.01); *B60L 58/18* (2019.02); *H04B 3/542* (2013.01); *H04B 3/548* (2013.01); *H04B 2203/547* (2013.01)

(58) Field of Classification Search
CPC .. H04B 15/04; H04B 7/15585; H04B 1/1036; H04B 3/542; H04B 3/548; H04L 1/20; H04L 25/03006; B60L 58/18
See application file for complete search history.

(56) References Cited

U.S. PATENT DOCUMENTS

| 4,947,461 A | * | 8/1990 | Yoshioka | ............. | H01H 25/041 |
| | | | | | 200/302.3 |
| 5,410,750 A | * | 4/1995 | Cantwell | ................. | G01S 19/21 |
| | | | | | 375/148 |

(Continued)

FOREIGN PATENT DOCUMENTS

| DE | 102013114198 A1 | 6/2014 |
| DE | 102015219666 A1 | 4/2017 |

(Continued)

OTHER PUBLICATIONS

International Search Report dated Oct. 2, 2018 of the corresponding International Application PCT/EP2018/059806 filed Apr. 18, 2018.

*Primary Examiner* — Khanh C Tran
(74) *Attorney, Agent, or Firm* — Norton Rose Fulbright US LLP; Gerard Messina

(57) ABSTRACT

A signal processing device is usable in a communication system and includes a signal path, a signal detector, a signal synthesizer, a transmission unit, and a receive path including an analog-to-digital converter. The signal path transmits a transmission signal that was transmitted by the communication system and that contains a communication signal. The signal detector detects, and generates an activation signal in response to, an interference signal contained in the transmission signal and occurring due to narrowband interferences. The signal synthesizer generates an approximation signal for the interference signal upon the presence of the activation signal. The transmission unit receives the transmission signal transmitted by the signal path and the (Continued)

approximation signal, and outputs a difference signal between the transmission signal and the approximation signal. The analog-to-digital converter converts a signal generated based on the difference signal into a digital signal.

20 Claims, 4 Drawing Sheets

(56) References Cited

U.S. PATENT DOCUMENTS

| | | | |
|---|---|---|---|
| 6,819,911 B2* | 11/2004 | Clelland | H04B 1/1027 |
| | | | 455/296 |
| 8,755,756 B1 | 6/2014 | Zhang et al. | |
| 2001/0041584 A1 | 11/2001 | Watanabe | |
| 2002/0142725 A1 | 10/2002 | Clelland et al. | |
| 2010/0159837 A1* | 6/2010 | Dent | H04B 1/525 |
| | | | 455/63.1 |
| 2011/0066052 A1* | 3/2011 | Mascarenhas | A61B 5/04017 |
| | | | 600/509 |
| 2011/0084771 A1 | 4/2011 | Nagaraj et al. | |
| 2012/0187898 A1* | 7/2012 | Nysen | H02J 7/342 |
| | | | 320/103 |
| 2012/0187907 A1* | 7/2012 | Nysen | H01M 10/052 |
| | | | 320/116 |
| 2014/0141301 A1* | 5/2014 | Aoki | H01M 10/482 |
| | | | 429/90 |
| 2015/0050904 A1 | 2/2015 | Egri et al. | |

FOREIGN PATENT DOCUMENTS

| | | |
|---|---|---|
| WO | 9400918 A1 | 1/1994 |
| WO | 2015035922 A1 | 3/2015 |

* cited by examiner

SIGNAL PROCESSING DEVICE FOR A COMMUNICATION SYSTEM USABLE IN PARTICULAR IN A BATTERY SYSTEM

CROSS-REFERENCE TO RELATED APPLICATIONS

The present application is the national stage of International Pat. App. No. PCT/EP2018/059806 filed Apr. 18, 2018, and claims priority under 35 U.S.C. § 119 to DE 10 2017 207 943.6, filed in the Federal Republic of Germany on May 11, 2017, the content of each of which are incorporated herein by reference in their entireties.

FIELD OF THE INVENTION

The present invention relates to a signal processing device for a communication system usable in particular in a battery system and a communication system usable in a battery system having such a signal processing device.

BACKGROUND

Battery management systems for battery systems which can be used in electric and/or hybrid vehicles are known from the related art. Such a battery system includes a battery, which is designed in particular in the form of a lithium-ion battery, including multiple battery modules, which each includes one or multiple battery cell(s). Such a battery management system includes a central battery monitoring unit and multiple battery module monitoring units. The battery monitoring unit is designed to monitor a functional state of the battery. Each of the battery module monitoring units is designed to monitor a functional state of one of the battery modules which is associated with the particular battery monitoring unit.

An above-described battery management system is designed in the form of a communication system. The central battery monitoring unit and the battery module monitoring units represent communication modules of the corresponding communication system. The communication modules are connected to one another using communication lines and can communicate with one another using communication signals. The communication signals are contained in transmission signals to be transmitted via the communication lines.

The communication lines can be designed in the form of a bus system.

To reduce weight and production costs of a battery system including such a battery management system, power lines, which are already present in the battery system and are provided for transmitting electric energy, are frequently used as communication lines for the battery management system. Such a type of communication is also referred to as power line communication. Such power lines, however, are not optimized for the transmission of signals at high frequencies, cause a high level of attenuation of transmitted signals, and are susceptible to noise interferences.

Noise interferences are frequently caused by narrowband interferences. Such interferences are coupled by passive antennas in the power lines and/or signal and data buses of an above-described battery system and transported to all connected components, including the battery of the particular battery system. Passive antennas can be formed, for example, by cable harnesses which are located in a vehicle including such a battery system.

An interference signal occurring due to narrowband interferences has an amplitude and a frequency which typically change very slowly over time and can therefore be assumed to be constant within a transmission duration of a short data packet, which is transmittable using power line communication. Such a transmission duration is less than 50 µs.

Interference signals which occur due to narrowband interferences are overlaid with the communication signals which are transmitted via the communication lines of an above-described battery management system. For this reason, the transmission signals transmitted via the communication lines are each to be considered a sum of a corresponding communication signal and an interference signal occurring due to narrowband interferences.

An above-described battery management system can include a signal processing device, which includes a signal path and a receive path. A transmission signal transmitted via the communication lines is then transmitted further via the signal path and provided to the receive path. The transmission signal includes a communication signal generated in particular in the form of a modulated signal and an interference signal occurring due to narrowband interferences. The receive path includes an analog-to-digital converter and a demodulator. The analog-to-digital converter is designed to convert the transmission signal transmitted by the signal path into a digital signal and provide the digital signal to the demodulator. The demodulator is designed to demodulate the digital signal.

It is to be taken into consideration here that the interference signal can be coupled at different strengths into the communication lines and therefore has an amplitude which is not constant over a frequency spectrum of the communication signal. At some frequencies, the amplitude of the interference signal can be so high that an amplitude of the transmission signal is outside a value range which is permissible for signal strengths of input signals of the analog-to-digital converter. In such a case, an input saturation of the analog-to-digital converter is reached, which results in an overload of the analog-to-digital converter. As a result of the overload, signal parts of the transmission signal which have a signal strength outside the permissible value range are cut off. A further transmission of these signal parts of the communication signal is therefore no longer possible. For this reason, the receive path includes an automatic gain control, which is connected between the signal path and the analog-to-digital converter.

The automatic gain control is designed to amplify or attenuate the transmission signal in such a way that an amplitude of the amplified or attenuated transmission signal is within the value range permissible for the analog-to-digital converter. In a case in which the amplitude of the transmission signal is too low, the transmission signal can be amplified using the automatic gain control in such a way that an amplitude of the amplified transmission signal is high enough to effectuate a high signal-to-quantification-noise ratio in the case of an analog-to-digital conversion to be carried out by the analog-to-digital converter.

The automatic gain control is not capable of differentiating between the communication signal and the interference signal. Therefore, the communication signal and the interference signal are attenuated or amplified to the same extent. This means that the signal-to-quantification-noise ratio is lowered if the amplitude of the transmission signal is outside the permissible value range and is attenuated by the automatic gain control. If an amplitude of the communication signal is also substantially less than the amplitude of the noise signal, it can occur that an amplitude of the attenuated communication signal decreases below a resolution limit of the analog-to-digital converter, so that a transmission quality is very strongly adversely affected.

A signal processing device which includes an automatic gain control is known from the document WO 2015/035922 A1.

SUMMARY

A signal processing device for a communication system, which is usable in particular in a battery system, is provided according to the present invention. The signal processing device includes a signal path, which is designed to receive a transmission signal transmitted by the communication system and containing a communication signal and to transmit it further. The signal processing device furthermore includes a signal detector, which is designed to detect an interference signal, which is present in the transmission signal and occurs due to narrowband interferences, and if the interference signal is present, to generate an activation signal. The signal processing device furthermore includes a signal synthesizer, which is designed upon the presence of the activation signal to generate an approximation signal, which reproduces the interference signal within predefined tolerance limits. The signal processing device furthermore includes a transmission unit, which is designed to receive the transmission signal transmitted by the signal path and the approximation signal and to output a difference signal, which is equal to a difference between the transmission signal and the approximation signal. The signal processing device furthermore includes a receive path including an analog-to-digital converter, which is designed to convert a signal generated based on the difference signal received by the receive path into a digital signal.

Because the approximation signal approximates a profile of the interference signal and is subtracted from the transmission signal, a noise level present in the transmission signal due to narrowband interferences is reduced. In this way, a probability that an overload of the analog-to-digital converter will occur as a result of a high amplitude of the interference signal is drastically reduced.

Furthermore, a signal-to-quantification-noise ratio, which occurs in the case of an analog-to-digital conversion to be carried out by the analog-to-digital converter, is increased. It is to be taken into consideration here that the transmission signal is to be considered as the sum of the communication signal and the interference signal. Since the approximation signal reproduces the interference signal within predefined tolerance limits, the difference signal essentially corresponds to the communication signal.

The signal generated based on the difference signal preferably corresponds to the difference signal.

Furthermore, the signal detector of the above-described signal processing device is preferably designed to determine at least one parameter of the interference signal and to detect the presence of the interference signal based on the at least one parameter.

According to an example embodiment of the present invention, the signal detector of an above-described signal processing device is designed to generate the activation signal upon the presence of an amplitude of the interference signal which exceeds a predefined amplitude limiting value. In this way, a signal processing effort, which is necessary in the case of a further transmission, which is carried out by the particular signal processing device, of transmission signals transmitted using the communication system, is reduced.

According to an example embodiment of the present invention, the interference signal contained in the transmission signal transmitted further by the above-described signal processing device is a sinusoidal signal. Alternatively or additionally, the approximation signal generated by the signal synthesizer of the particular signal processing device is a periodic signal, which corresponds to a triangle signal, a square-wave signal, or a sinusoidal signal.

According to an example embodiment of the present invention, the signal detector of an above-described signal processing device includes a determination unit. Alternatively or additionally, the signal synthesizer of the particular signal processing device is designed in the form of an analog circuit including a comparator and an integrator. The determination unit is designed to determine a crest factor of the transmission signal and to detect the presence of the interference signal on the basis of the determined crest factor.

The determination unit preferably includes an analog circuit, which is designed to determine the crest factor of the transmission signal. Furthermore, the determination unit preferably includes a digital processor, which is designed to execute at least one algorithm for determining the crest factor of the transmission signal.

According to an example embodiment of the present invention, the comparator of an above-described signal processing device is connected on the input side to the determination unit and on the output side to the integrator.

The interference signal can be sinusoidal, and that a sinusoidal signal has a crest factor of approximately 1.41. It is furthermore to be taken into consideration here that the communication signal is in particular a modulated signal, which is generated using one or multiple carrier signal(s), which each has a crest factor which is different from a crest factor of a sinusoidal signal. In such a case, the determination unit can detect the presence of the interference signal in a particularly low-effort manner based on the crest factor of the transmission signal.

The analog circuit of the signal synthesizer is preferably designed to generate the approximation signal in the form of a periodic signal, which corresponds to a triangle signal, a square-wave signal, or a sinusoidal signal.

Furthermore, the signal detector is preferably designed to activate the comparator using the activation signal, immediately after the signal detector has detected the presence of the interference signal.

According to an example embodiment of the present invention, the communication signal contained in the transmission signal transmitted further in an above-described signal processing device is a modulated signal.

The communication signal is preferably a signal modulated using an orthogonal frequency multiplex method. Furthermore, the communication signal is preferably a signal modulated using a frequency modulation method.

According to an example embodiment of the present invention, a crest factor of a carrier signal of the communication signal contained in the transmission signal transmitted further by an above-described signal processing device is different from a crest factor of the interference signal contained in the transmission signal.

According to an example embodiment of the present invention, the receive path of an above-described signal processing device includes a demodulator, which is designed to receive and demodulate the digital signal.

According to an example embodiment of the present invention, the receive path of an above-described signal processing device includes a bandpass filter and/or an automatic gain control. The bandpass filter and/or the automatic gain control are each connected on the input side to the transmission unit and on the output side to the analog-to-digital converter. The bandpass filter is designed to let pass parts of its input signals that have frequencies in a frequency spectrum of the communication signal and to suppress parts of its input signals that have frequencies outside the frequency spectrum of the communication signal. Alternatively or additionally, the automatic gain control is designed to amplify or attenuate and then output its input signals in such a way that its output signals have amplitudes in a value range that is permissible for signal strengths of input signals of the analog-to-digital converter.

According to an example embodiment of the present invention, the automatic gain control of an above-described signal processing device is connected between the bandpass filter in the analog-to-digital converter.

The use of the bandpass filter is advantageous in that all parts of the approximation signal contained in the difference signal which have frequencies outside the frequency spectrum of the communication signal are filtered out. An evaluation effort which is necessary in the case of an evaluation of pieces of useful information contained in the communication signal is thus reduced, since the filtered-out parts of the approximation signal do not contain pieces of useful information and also no longer have to be evaluated. The difference signal is obtained by subtracting the approximation signal from the transmission signal.

The use of the automatic gain control is advantageous in that the automatic gain control can amplify the difference signal in such a way that an amplitude of the amplified difference signal is high enough to effectuate a high signal-to-quantification-noise ratio upon a corresponding analog-to-digital conversion. An amplification of the difference signal can take place if the difference signal has an excessively low amplitude. Since the difference signal is obtained by subtracting the approximation signal from the transmission signal and thus the difference signal primarily corresponds to the communication signal, upon an amplification of the difference signal, primarily the communication signal is amplified. Therefore, an amplification of the difference signal results in an improved availability of the pieces of useful information contained in the communication signal.

The use of the automatic gain control is furthermore advantageous in that the automatic gain control can attenuate the difference signal in such a way that an amplitude of the attenuated difference signal is within a value range permissible for the analog-to-digital converter. An attenuation of the difference signal can take place if the difference signal has an excessively high amplitude. An overload of the analog-to-digital converter is avoided by such an attenuation. It is thus ensured that all pieces of useful information contained in the communication signal can be utilized. Since the difference signal is obtained by subtraction of the approximation signal from the transmission signal and thus the difference signal primarily corresponds to the communication signal, an inflation of the amplitude of the difference signal caused by the interference signal occurs much more rarely. Attenuation of the difference signal to be carried out solely because of the interference signal is thus necessary significantly more rarely. The availability of the pieces of useful information contained in the communication signal is thus improved.

An above-described signal processing device can preferably be implemented using hardware components that require little electrical power and also entail low production costs. Furthermore, an above-described signal processing device can preferably be integrated into an application-specific integrated circuit.

A further aspect of the present invention relates to a communication system for a battery system including a battery with multiple battery modules, which each includes one or multiple battery cell(s). The communication system includes multiple communication modules and multiple communication lines. The communication modules are connected to one another using the communication lines and are designed to communicate with one another using communication signals, which are contained in transmission signals to be transmitted via the communication lines. The communication modules are each designed to monitor a functional state of the battery or one of the battery modules. The communication system furthermore includes an above-described signal processing device.

The communication lines preferably correspond at least partially to power lines that are present in the battery system and are designed to transmit electric energy.

An above-described signal processing device can operate in a broad frequency spectrum of the transmission signal and is independent of a topology of a battery used in a battery system including an above-described communication system.

Since a probability at which an overload of the analog-to-digital converter occurs is drastically reduced using the above-described signal processing device, a probability at which disastrous errors occur, which are caused by an overload of the analog-to-digital converter, is also drastically reduced. In this way, an operational reliability of an above-described communication system, which includes an above-described signal processing device, is also increased.

Furthermore, a signal-to-quantification-noise ratio upon a corresponding analog-to-digital conversion is increased using an above-described signal processing device. In this way, a functionality of the above-described communication system which includes an above-described signal processing device is also improved.

An example embodiment of the present invention is described in detail hereafter with reference to the appended drawings. Identical reference numerals are used in each case for identical components and parameters.

DETAILED DESCRIPTION

Figure 1:
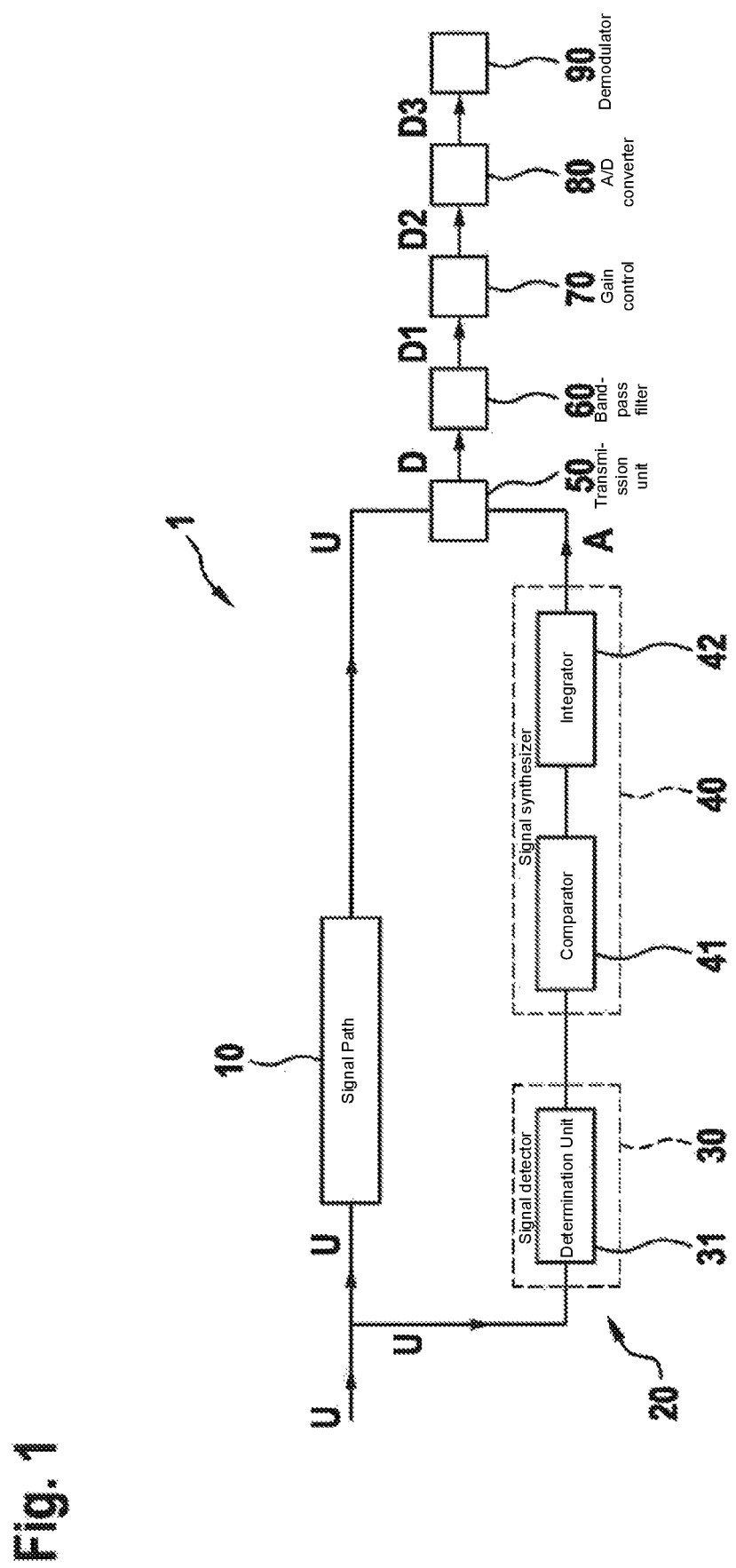
FIG. 1 shows a signal processing device designed according to an example embodiment of the present invention for processing a transmission signal, which contains a communication signal and an interference signal.

FIG. 1 shows a signal processing device 1 for a communication system (not shown) usable in a battery system and designed as a battery management system. The signal processing device includes a signal path 10, which is designed to receive a transmission signal U transmitted by the communication system and transmit it further. Transmission signal U contains a communication signal and an interference signal occurring due to narrowband interferences and can be represented as a sum of the communication signal and the interference signal. The communication signal is a signal modulated using one or multiple carrier signal(s). The interference signal occurs in the form of a sinusoidal signal and has a crest factor of approximately 1.41. A crest factor of the interference signal is different from a crest factor of the communication signal.

Furthermore, signal processing device 1 includes a signal detector 30, which is designed to detect a presence of the interference signal and to generate an activation signal upon the presence of the interference signal. In particular, signal detector 30 is designed to generate the activation signal upon the presence of an amplitude of the interference signal that exceeds a predefined amplitude limiting value. Signal detector 30 includes a determination unit 31, which is designed to determine a crest factor of transmission signal U and to detect the presence of the interference signal based on the determined crest factor.

Furthermore, signal processing device 1 includes a signal synthesizer 40, which is designed to generate an approximation signal A, which reproduces the interference signal within predefined tolerance limits, upon the presence of the activation signal. Signal synthesizer 40 is designed in the form of an analog circuit including a comparator 41 and an integrator 42, comparator 41 being connected on the input side to determination unit 31 and on the output side to integrator 42. Comparator 41 is activated using the activation signal upon the presence of the interference signal. The analog circuit then generates approximation signal A in the form of a periodic signal, which corresponds to a triangle signal, a square-wave signal, or a sinusoidal signal.

Signal processing device 1 furthermore includes a transmission unit 50, which is designed to receive transmission signal U transmitted by signal path 10 and approximation signal A and to output a difference signal D, which is equal to a difference between transmission signal U and approximation signal A.

Signal processing device 1 furthermore includes a receive path for receiving difference signal D. The receive path includes a bandpass filter 60 connected downstream from transmission unit 50, an automatic gain control 70 connected downstream from bandpass filter 60, an analog-to-digital converter 80 connected downstream from automatic gain control 70, and a demodulator 90 connected downstream from analog-to-digital converter 80.

Bandpass filter 60 is designed to receive difference signal D and output it as filtered difference signal D1. Bandpass filter 60 is designed to let pass parts of difference signal D that include frequencies in a frequency spectrum of the communication signal and to suppress parts of difference signal D that include frequencies outside the frequency spectrum of the communication signal.

Automatic gain control 70 is designed to receive filtered difference signal D1, amplify or attenuate filtered difference signal D1, and output it as an amplified or attenuated difference signal D2. Filtered difference signal D1 is amplified or attenuated using automatic gain control 70 in such a way that an amplitude of amplified or attenuated difference signal D2 is in a value range that is permissible for signal strengths of input signals of analog-to-digital converter 80.

Analog-to-digital converter 80 is designed to receive amplified or attenuated difference signal D2 and convert it into a digital signal D3.

Demodulator 90 is designed to receive and demodulate digital signal D3.

Figure 2:
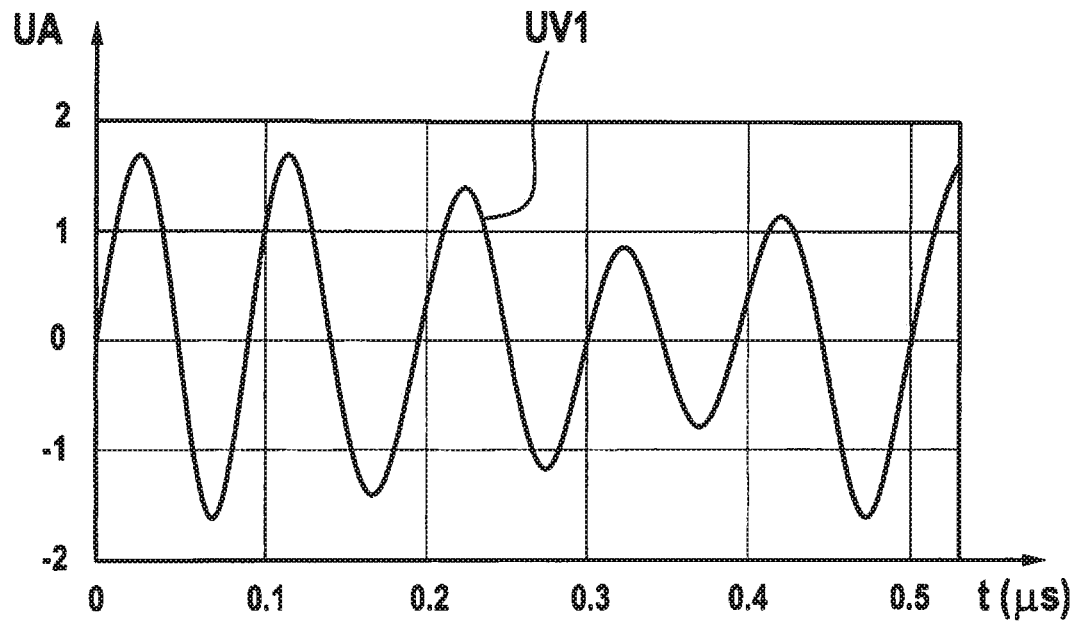
FIG. 2 shows a curve of the transmission signal plotted in the time range according to an example embodiment of the present invention.

FIG. 2 shows a curve UV1 of a signal strength of transmission signal U as a function of time measured in microseconds ($\mu$s) (a microsecond being equal to $10^{-6}$ seconds). Unitless values are indicated on an axis identified with UA in FIG. 2, which can be assumed from the signal strength of transmission signal U standardized to a predefined signal strength value. In the example shown in FIG. 2, the communication signal contained in transmission signal U is a signal modulated using an orthogonal frequency multiplexing method. This means that in the example shown in FIG. 2, the communication signal is modulated using multiple carrier frequencies 50. A curve of a symbol associated with this communication signal is made up of a sum of all four modulated carrier frequencies.

Figure 3:
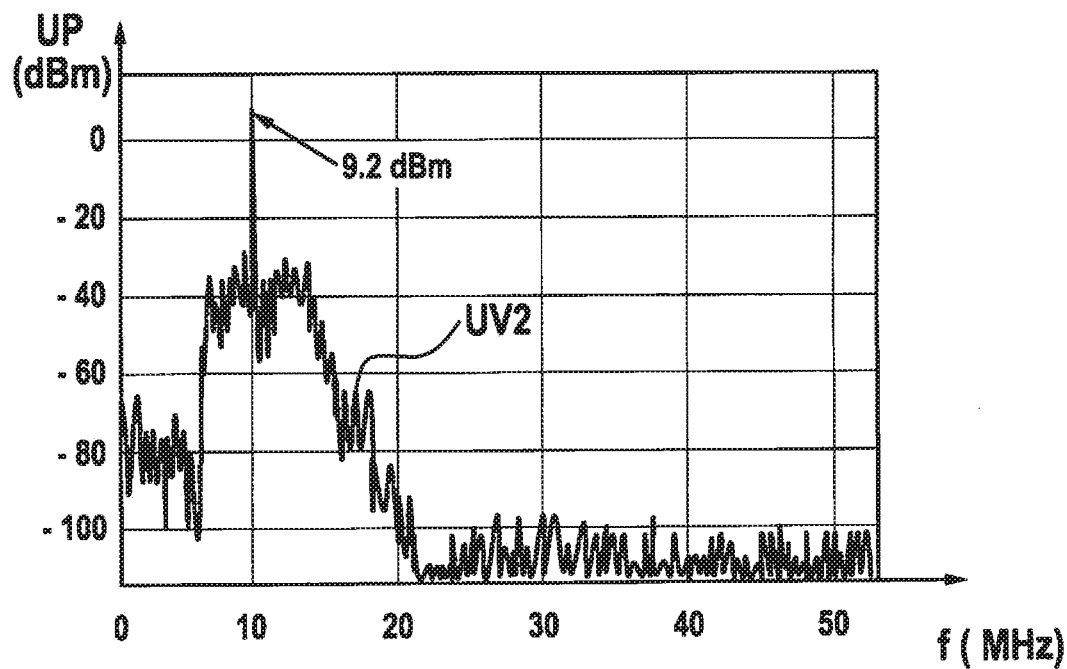
FIG. 3 shows a curve of the transmission signal plotted in the frequency range according to an example embodiment of the present invention.

FIG. 3 shows a curve UV2 of a power level of transmission signal U shown in FIG. 2 as a function of frequency f measured in megahertz (MHz). In FIG. 3, values in decibel milliwatts (dBm), which can be assumed from the power level of transmission signal U, are indicated on an axis identified with UP. A decibel-milliwatt is a unit of a power level which describes the ratio of a power in comparison to a reference performance of one milliwatt, and one milliwatt is equal to $10^{-3}$ W.

In the example shown in FIG. 3, the power level of transmission signal U at a frequency of approximately 10 MHz has a strongly inflated value due to a high amplitude of the interference signal. This value is approximately 9.2 dBm and is therefore more than 40 dB greater than a value which is assumed from a power level of the communication signal at the same frequency.

Figure 4:
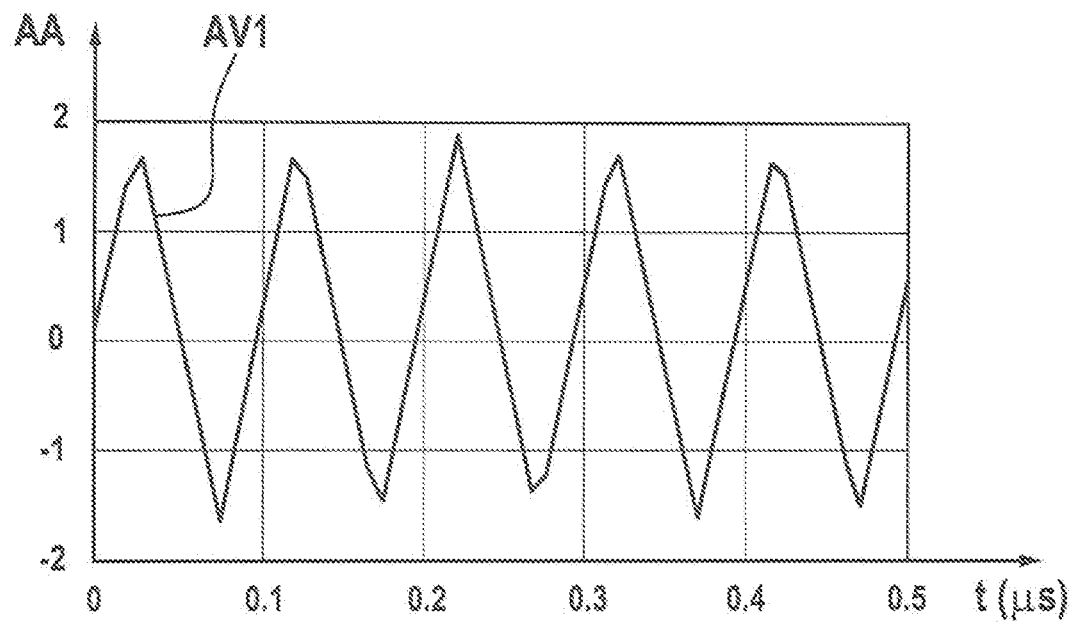
FIG. 4 shows a curve of an approximation signal, which reproduces the interference signal within predefined tolerance limits, plotted in the time range, according to an example embodiment of the present invention.

FIG. 4 shows a curve AV1 of a signal strength of approximation signal A as a function of time t measured in microseconds. In FIG. 4, unitless values, which can be assumed from the signal strength of approximation signal A, standardized to a predefined signal strength value, are indicated on an axis identified by AA. In the example shown in FIG. 4, approximation signal A is a periodic signal, which corresponds to a triangle signal. In the example shown in FIG. 4, approximation signal A reproduces the interference signal, which is contained in transmission signal U illustrated in FIG. 2, within predefined tolerance limits.

Figure 5:
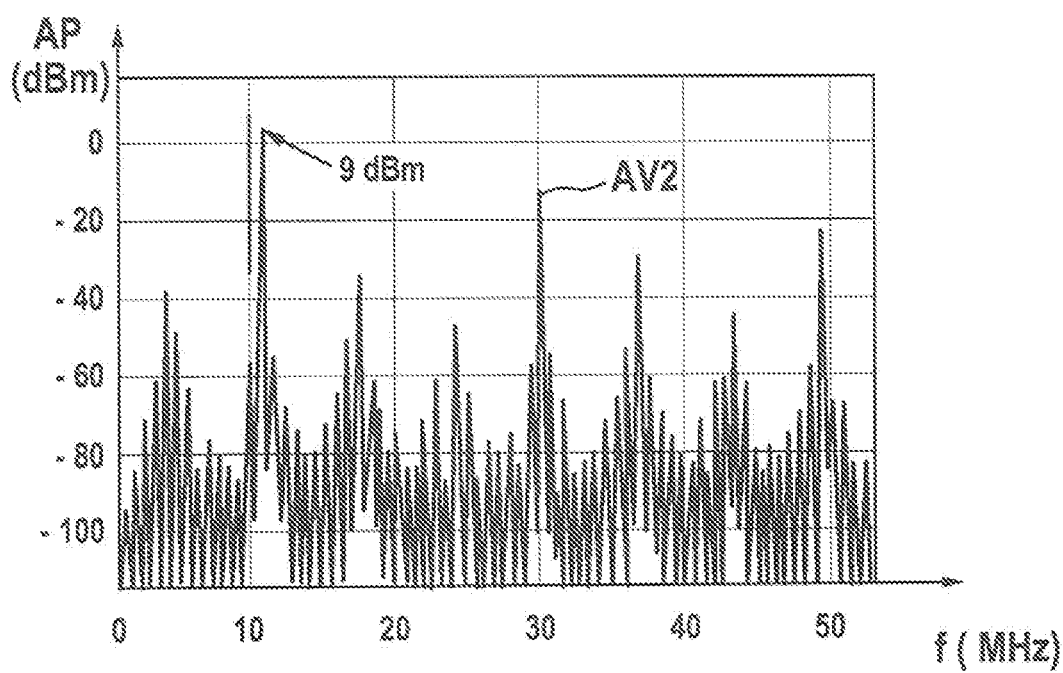
FIG. 5 shows a curve of the approximation signal plotted in the frequency range according to an example embodiment of the present invention.

FIG. 5 shows a curve AV2 of a power level of approximation signal A shown in FIG. 4 as a function of frequency f measured in megahertz (MHz). In FIG. 5, values in decibel-milliwatts, which can be assumed from the power level of approximation signal A, are indicated on an axis identified by AP. It is apparent from FIG. 5 that the power level of approximation signal A assumes a maximum value of 9 dBm at a frequency of 10 MHz.

Figure 6:
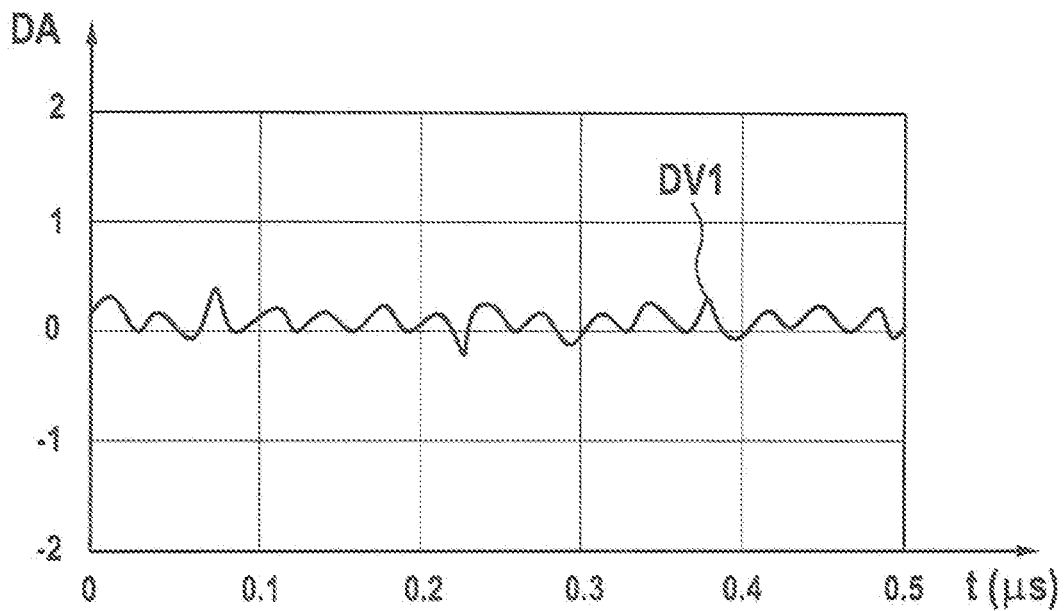
FIG. 6 shows a curve of a difference signal, which is equal to a difference between the transmission signal and the approximation signal, plotted in the time range, according to an example embodiment of the present invention.

FIG. 6 shows a curve DV1 of a signal strength of difference signal D as a function of time t measured in microseconds. In FIG. 4, unitless values, which can be assumed from the signal strength of difference signal D standardized to a predefined signal strength value, are indicated on an axis identified with DA. In the example shown in FIG. 6, difference signal D is obtained by subtraction of approximation signal A shown in FIG. 4 from transmission signal U shown in FIG. 2.

Figure 7:
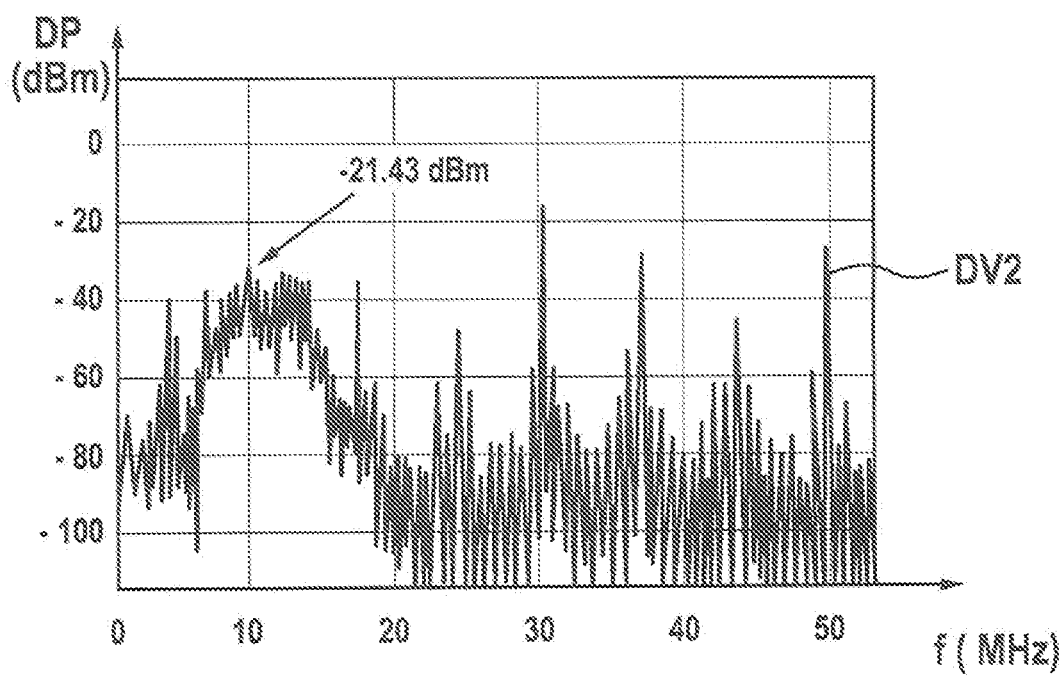
FIG. 7 shows a curve of the difference signal plotted in the frequency range according to an example embodiment of the present invention.

FIG. 7 shows a curve DV2 of a power level of difference signal D shown in FIG. 6 as a function of frequency f measured in megahertz (MHz). In FIG. 7, values in decibel milliwatts, which can be assumed from the power level of difference signal D, are indicated on an axis identified by DP. It is apparent from FIG. 7 that at a frequency of 10 MHz, the power level of difference signal D has a value which is approximately −21.43 dBm and is therefore almost 30 dB less than the value which is assumed from the power level of transmission signal U shown in FIG. 3 at the same frequency. It is furthermore apparent from FIG. 7 that harmonics of approximation signal A are outside a frequency spectrum of the communication signal, in particular outside that of the symbol associated with the communication signal, and therefore can be filtered out easily using bandpass filter 60.

In addition to the written disclosure above, reference is additionally made to the illustration in FIGS. 1-7 for the further disclosure of the present invention.

What is claimed is:

1. A signal processing device comprising:
   a signal path;
   a signal detector;
   a signal synthesizer;
   a transmitter; and
   an analog-to-digital converter;
   wherein:
      the signal path is configured to (a) receive a transmission signal transmitted by a communication system and containing a communication signal and (b) transmit the received transmission signal;
      the signal detector is configured to detect a presence of an interference signal contained in the transmission signal and occurring due to narrowband interferences;
      in response to the detection of the presence of the interference signal:
         the signal detector is configured to generate an activation signal; and
         the signal synthesizer is configured to generate an approximation signal that reproduces the interference signal within predefined tolerance limits;
      the transmitter is configured to (a) receive the transmission signal transmitted by the signal path and the approximation signal and (b) output a difference signal between the transmission signal and the approximation signal;
      the analog-to-digital converter is configured to convert a signal that is generated based on the difference signal output by the transmitter into a digital signal; and
      any one or more of the following three features (1)-(3):
         (1) the signal synthesizer is an analog circuit including a comparator and an integrator;
         (2) the signal detector is configured to determine a crest factor of the transmission signal and detect the presence of the interference signal based on the determined crest factor; and
         (3) a crest factor of a carrier signal of the communication signal is different from a crest factor of the interference signal.

2. The signal processing device of claim 1, wherein the signal detector is configured to generate the activation signal in response to an amplitude of the interference signal exceeding a predefined amplitude threshold value.

3. The signal processing device of claim 1, wherein the interference signal is a sinusoidal signal.

4. The signal processing device of claim 1, wherein the approximation signal is a periodic signal that corresponds to a triangle signal, a square-wave signal, or a sinusoidal signal.

5. The signal processing device of claim 1, wherein the signal synthesizer is the analog circuit including the comparator and the integrator.

6. The sugnal processing device of claim 1, wherein the signal detector is configured to determine the crest factor of the transmission signal and detect the presence of the interference signal based on the determined crest factor.

7. The signal processing device of claim 6, wherein the signal synthesizer is an analog circuit including a comparator and an integrator.

8. The signal processing device of claim 7, wherein an input side of the comparator is connected to the signal detector and an output side of the comparator is connected to the integrator.

9. The signal processing device of claim 1, wherein the communication signal is a modulated signal.

10. The signal processing device of claim 9, wherein the crest factor of the carrier signal of the communication signal is different from the crest factor of the interference signal.

11. The signal processing device of claim 9, further comprising a demodulator, wherein the demodulator is configured to receive and demodulate the digital signal.

12. The signal processing device of claim 1, further comprising a bandpass filter, wherein:
   an input side of the bandpass filter is connected to the transmitter;
   an output side of the bandpass filter is connected to the analog-to-digital converter; and
   the bandpass filter is configured to let pass parts of its input signals which include frequencies which are in a frequency spectrum of the communication signal and to suppress parts of its input signals which include frequencies which are outside the frequency spectrum of the communication signal.

13. The signal processing device of claim 12, further comprising an automatic gain control, wherein:
   an input side of the automatic gain control is connected to the transmitter;
   an output side of the automatic gain control is connected to the analog-to-digital converter; and
   the automatic gain control is configured to amplify or attenuate its input signals and then output them in such a way that its output signals include amplitudes that are in a value range which is permissible for signal strengths of input signals of the analog-to-digital converter.

14. The signal processing device of claim 13, wherein the automatic gain control is connected between the bandpass filter and the analog-to-digital converter.

15. The signal processing device of claim 1, further comprising an automatic gain control, wherein:
   an input side of the automatic gain control is connected to the transmitter;
   an output side of the automatic gain control is connected to the analog-to-digital converter; and
   the automatic gain control is configured to amplify or attenuate its input signals and then output them in such a way that its output signals include amplitudes that are in a value range which is permissible for signal strengths of input signals of the analog-to-digital converter.

16. The signal processing device of claim 1, wherein the crest factor of the carrier signal of the communication signal is different from the crest factor of the interference signal.

17. A communication system for a battery system comprising:
a signal processing device;
a battery that includes a plurality of battery modules, wherein each of the battery modules includes one or more battery cells;
a plurality of communication lines; and
a plurality of communication modules;
wherein:
the plurality of communication modules are configured to:
monitor a functional state of the battery or of one of the battery modules; and
communicate with one another via a communication signal contained in a transmission signal transmitted via the communication lines;
the signal processing device includes a signal path, a signal detector, a signal synthesizer, a transmitter, and an analog-to-digital converter;
the signal path is configured to (a) receive the transmission signal and (b) transmit the received transmission signal;
the signal detector is configured to detect a presence of an interference signal contained in the transmission signal and occurring due to narrowband interferences;
in response to the detection of the presence of the interference signal:
the signal detector is configured to generate an activation signal; and
the signal synthesizer is configured to generate an approximation signal that reproduces the interference signal within predefined tolerance limits;
the transmitter is configured to (a) receive the transmission signal transmitted by the signal path and the approximation signal and (b) output a difference signal between the transmission signal and the approximation signal; and
the analog-to-digital converter is configured to convert a signal that is generated based on the difference signal output by the transmitter into a digital signal.

18. The communication system of claim 17, wherein the communication lines at least partially correspond to power lines present in the battery system and are configured to transmit electric energy of the battery cells.

19. A signal processing device comprising:
a signal path;
a signal detector;
a signal synthesizer;
a transmitter; and
an analog-to-digital converter;
wherein:
the signal path is configured to (a) receive a transmission signal transmitted by a communication system and containing a communication signal and (b) transmit the received transmission signal;
the signal detector is configured to detect a presence of an interference signal contained in the transmission signal and occurring due to narrowband interferences;
in response to the detection of the presence of the interference signal:
the signal detector is configured to generate an activation signal; and
the signal synthesizer is configured to generate an approximation signal that reproduces the interference signal within predefined tolerance limits;
the transmitter is configured to (a) receive the transmission signal transmitted by the signal path and the approximation signal and (b) output a difference signal between the transmission signal and the approximation signal;
the analog-to-digital converter is configured to convert a signal that is generated based on the difference signal output by the transmitter into a digital signal; and
the signal processing device is configured so that the signal synthesizer always generates the approximation signal as a periodic signal.

20. The signal processing device of claim 19, further comprising a bandpass filter, wherein:
an input side of the bandpass filter is connected to the transmitter for receiving the difference signal output by the transmitter; the
an output side of the bandpass filter is connected to the analog-digital converter; and
the bandpass filter is configured to:
let pass parts of its input signals that include frequencies that are in a frequency spectrum of the communication signal; and
suppress parts of its input signals that include the frequencies that are outside the frequency spectrum of the communication signal.

* * * * *